(No Model.) 6 Sheets—Sheet 1.

W. H. MAYO.
KNITTING MACHINE.

No. 274,208. Patented Mar. 20, 1883.

WITNESSES
E. J. Nottingham
Geo. O. Seymour

INVENTOR
Wm. H. Mayo.
By H. A. Seymour,
Attorney (No Model.) 6 Sheets—Sheet 3.

W. H. MAYO.
KNITTING MACHINE.

No. 274,208. Patented Mar. 20, 1883.

WITNESSES
INVENTOR (No Model.) 6 Sheets—Sheet 4.

W. H. MAYO.
KNITTING MACHINE.

No. 274,208. Patented Mar. 20, 1883.

WITNESSES  
E. J. Nottingham  
Geo. D. Seymour

INVENTOR  
Wm H Mayo  
By H. A. Seymour  
Attorney (No Model.)

W. H. MAYO.
KNITTING MACHINE.

No. 274,208. Patented Mar. 20, 1883.

WITNESSES

INVENTOR (No Model.) 6 Sheets—Sheet 6.

W. H. MAYO.
KNITTING MACHINE.

No. 274,208. Patented Mar. 20, 1883.

WITNESSES

INVENTOR
Wm H. Mayo.
By H A Seymour,
Attorney

UNITED STATES PATENT OFFICE.

WILLIAM H. MAYO, OF ST. JOSEPH, MICHIGAN.

KNITTING-MACHINE.

SPECIFICATION forming part of Letters Patent No. 274,208, dated March 20, 1883.

Application filed February 21, 1882. (No model.)

*To all whom it may concern:*

Be it known that I, WILLIAM H. MAYO, of St. Joseph, in the county of Berrien and State of Michigan, have invented certain new and useful Improvements in Knitting-Machines; and I do hereby declare the following to be a full, clear, and exact description of the invention, such as will enable others skilled in the art to which it pertains to make and use the same.

My invention relates to knitting-machines, and more particularly to that class of machines having dual functions in being adapted to knit both circular and straight fabric.

The object of my invention is to provide improved devices for imparting to the needles, when the machine is being operated to knit straight fabric, those motions necessary to the performance of their work.

A further object of my invention is to provide improved devices for elevating and depressing the needle-cylinder to regulate the tension of the fabric produced.

A further object of my invention is to provide improved means for suspending the cam-cylinder in the bed-plate of the machine.

A further object of my invention is to provide devices for compensating for the wear of the suspension-bearings of the cam-cylinder.

A further object of my invention is the adaptation of one machine to knit both coarse and fine fabrics, such an adaptation consisting in a removable skeleton cylinder.

A further object of my invention is to employ the motive force, due to the weight as it descends, to automatically stop the machine.

A further object of my invention is to provide devices arranged to automatically stop the machine at any predetermined stage of development in the article being knitted.

A further object of my invention is to provide an indicator to inform the operator of the progress of the article being knitted, and thus enable him to give the tension-regulator appropriate manipulation.

A further object of my invention is to provide an improved form of weight and devices for guiding the same.

A further object of my invention is to provide an improved take-up device to be employed when the machine is being operated to knit straight fabric.

With these objects in view my invention consists in certain details of construction and combinations of parts, as will be hereinafter described, and pointed out in the claims.

In the accompanying drawings.

Figure 1:
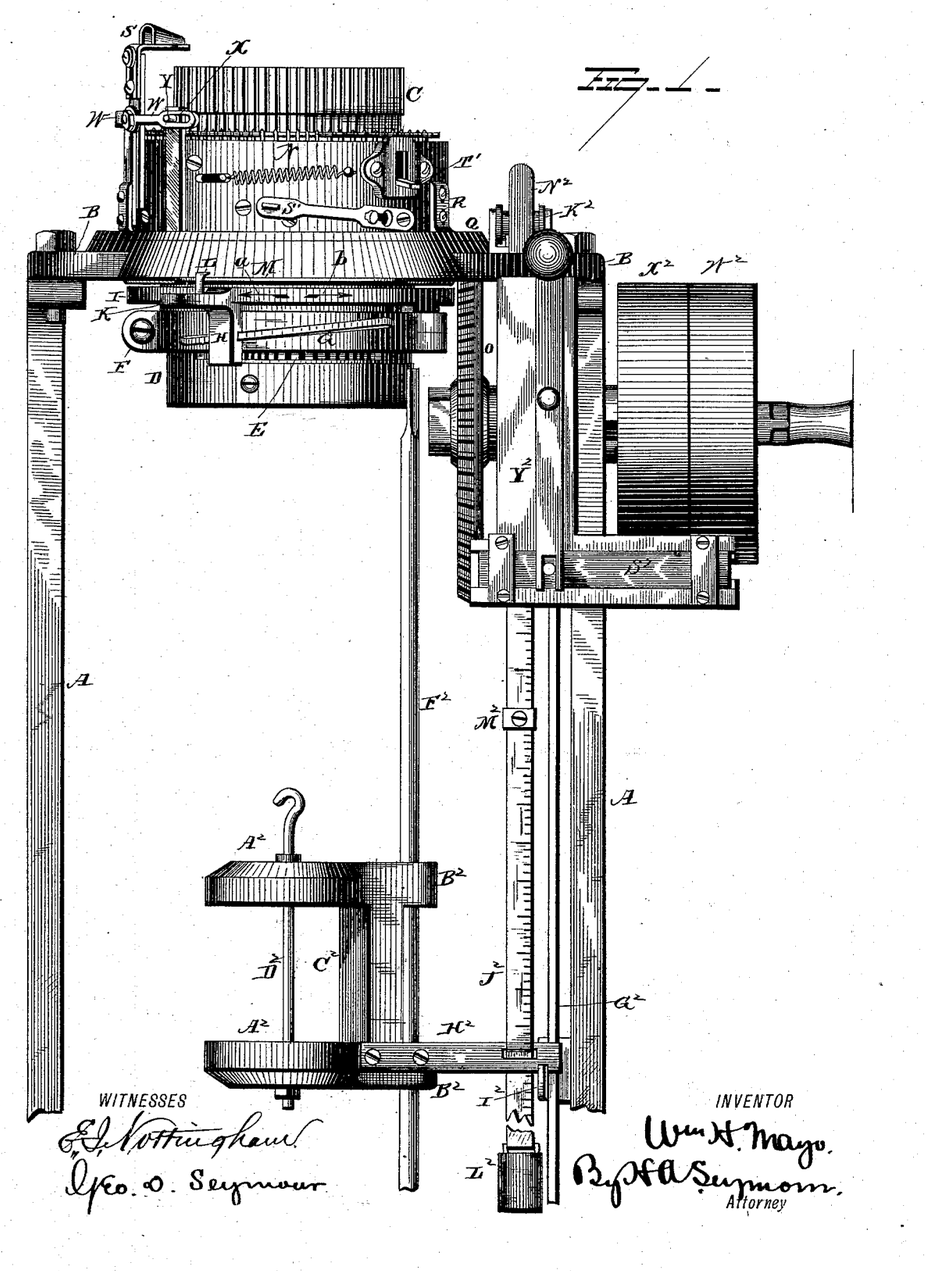
Figure 1 is a view in front elevation of a knitting-machine constructed in accordance with my invention.
Figure 2:
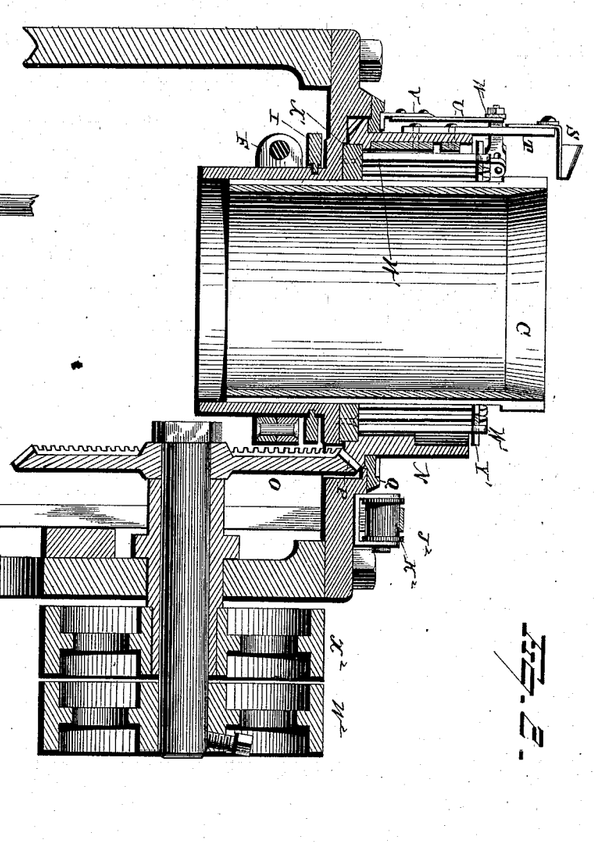
Fig. 2 is a view of the principal portions thereof in vertical cross-section.
Figure 7:
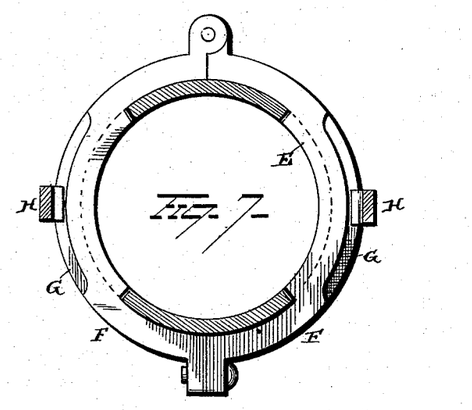
Fig. 7 is a view in horizontal cross-section through the flange depending from the bed-plate, showing the devices for changing the adjustment of the needle-cylinder with respect to the cam-cylinder.

A A are standards arranged and adapted to support the bed-plate B, which is centrally perforated to receive the needle-cylinder C. The said bed-plate is provided with a depending annular flange, D, which is cut away on each side, as at E, to expose portions of the outer face of the needle-cylinder, and permit the same to be engaged with the clamp F, embracing the said flange. The opposite faces of the clamp F are provided with inclines G, which are received within the slotted lugs H of the movable ring I, which is mounted in a groove, J, encircling the depending flange D at a point very near its junction with the bed-plate.

K is an operating-lever made integral with or secured to the ring I. It is provided with an indicating-point, L, arranged to move over the graduated plate M, secured to the under face and near the outer edge of the bed-plate.

It will be evident from a study of the drawings that any movement of the lever K in the direction of the arrow $a$ will, through the medium of the slotted lugs H and the inclines G, elevate the clamp F and the needle-cylinder C, while at the same time the point L will indicate a relaxation of tension upon the plate M. Again, if the lever K be moved in the direction of the arrow $b$, it will, through the lugs and inclines H and G, respectively, depress the said clamp and cylinder and indicate an increase of tension upon the plate M. The effect upon the tension of the fabric produced, resulting from an elevation or depression of the needle-cylinder, is due to changes in the length of the stitches consequent thereupon, any elevation of the cylinder being accompanied by an increase in the length of the stitches and a relaxation in the tension of the fabric being knitted, while any depression of the cylinder results in a decrease in the length of the stitches and an increase of tension in the fabric, and as a relaxation or an increase of tension respectively produces an increase or decrease in the diameter of the tube of the fabric, by an appropriate manipulation of the lever K, the article being knitted may be increased or decreased in diameter, and any desired form imparted to it within the scope of the adjustment of the needle-cylinder. It may be here remarked that the cylinder may be readily removed from the machine by unscrewing the screw which unites the two hinged sections of the clamp F. Rotary motion is imparted to the cam-cylinder N by the bevel cog-wheel O, which meshes with the bevel cog-teeth P, formed on the lower edge of the said cylinder, which is suspended in an annular bearing-plate, Q, adapted to be rigidly secured to the bed-plate D. This suspension is effected by means of the vertically-adjustable plates R, which are secured to the outer face of the cam-cylinder in position to bear upon the said plate Q.

The object in making provision for the vertical adjustment of these plates is to permit a compensation for any wear which may result from friction between them and the plate Q. A yarn-guide, S, is adjustably secured to the plate T, attached to and extending above the cam-cylinder.

Figure 4:
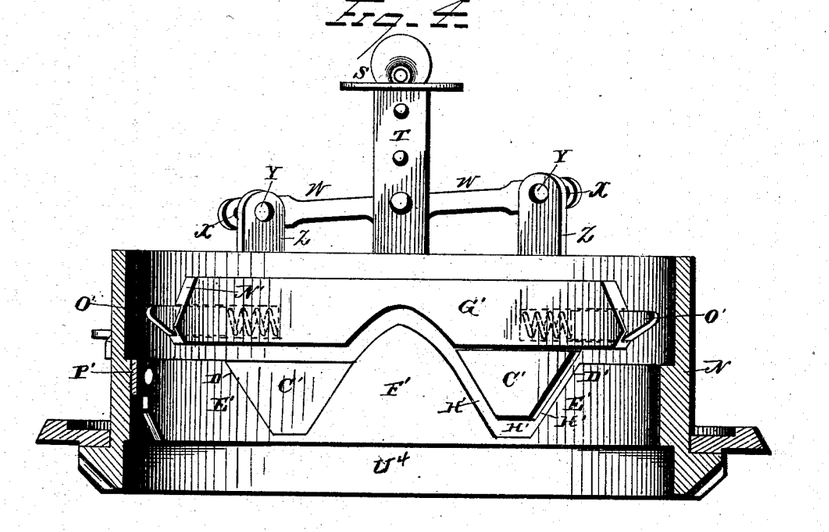
Fig. 4 is a view in elevation of the interior of the cam-cylinder, showing the devices employed to impart appropriate motions to the needles when the machine is set for knitting straight fabric.

A depending arm, U, pivotally secured to the plate T, is provided with a plate, V, having bearing upon the annular bearing-ring Q, before described. The character of this bearing is such that the plates U and V will always be retarded in an opposite direction from that in which the cylinder is moving, and thereby effect the depression of that end of the bar W which precedes the guide S and the elevation of the end of the bar which follows the guide, the said bar being pivoted midway of its length to the plate T, and made rigid with the depending arm U, provided with elongated horizontal slots X, adapted to receive the pins Y, which project from the outer faces of the upper ends of the cam-links Z, the same being arranged to impart the motion which they receive from the ends of the bar W aforesaid to small plates A', located in vertical slots B', formed in the cam-cylinder. Wedge-shaped stitch-cams C', located within the cam-cylinder and secured to the inner faces of the said plates A', are thereby adapted to be reciprocated in V-shaped recesses formed in the ledge E'.

A guide-plate, G', located above and extending beyond the outer edges of the recesses D', is designed to prevent the needles from being thrown out of position by the inertia they acquire from the rapid rotation of the cam-cylinder.

By means of the reciprocating motion imparted to the cams C', grooves H', having oppositely-inclined walls, are alternately opened and closed. When one cam is elevated to form one of the said grooves the other cam will be depressed, its upper face forming a continuation of the upper edge of the ledge E'. It is evident that this action must result from the oscillation of the bar W, pivoted to the plate T, caused by a retardation of the depending arm U, before described.

It will be observed that the needle-elevating plate F', which is located directly below the yarn-guide S, extends above the level of the upper or working edge of the ledge E' and into a recess formed in the guide-plate G', said recess being sufficiently deep to permit the heels of the needles to be elevated over the top of the said needle-elevating plate.

In knitting-machines as ordinarily constructed the yarn-guide and the ledge have such relative disposition to each other that the yarn is supplied to the needles while they are in repose, or, in other words, while their heels are resting upon the level upper edge of the ledge. This construction is, however, objectionable, for the reason that the needles are necessarily set so high that they project so far above the needle-cylinder that their latches are liable to fall and elude the latch-closer, and hence permit the needles to escape the yarn. Again, when so much of the needles are exposed without protection they are liable to be broken, or to be so distorted as to become inoperative. In overcoming these objections I depress the ledge in the cam-cylinder, so that it will normally support the needles in an elevation wherein their latches are located just above the upper edge of the needle-cylinder. In this position the needles will not take the yarn, and therefore the needle-elevating plate F' is employed to elevate them at the proper moment for taking it, immediately after which they are depressed to form the stitch by the descent of their heels into the oppositely-inclined grooves H'.

When the machine is being operated for circular knitting, that one of the stitch-cams C' which precedes the yarn-guide will be depressed and form a continuation of the ledge to support the needles until they are elevated over the plate F', while the cam which follows the yarn-guide will be elevated to permit the heels of the needles to pass under it, for the purpose of depressing the needles and forming stitches of the yarn which they have just taken. As long as the direction in which the cam-cylinder is rotated remains unchanged the position of the cams will not be altered. When, however, straight fabric is being knitted by employing only a portion of the needles and imparting a reciprocatory motion to the cam-cylinder, it is apparent that the position of the cams O' must be changed as frequently as the direction of the said cylinder's movement is reversed, in order to maintain the cam preceding the cylinder depressed and the one following it elevated, for the purpose of imparting in the proper succession those reciprocating motions to the needles necessary to cause them to take the yarn and make the proper stitches. The required alternating changes in the positions of the cams is effected, as before described, by means of the plates U and V and the bar W, for as the direction of the cam-cylinder's rotation is reversed the depending arm U will be retarded in an opposite direction from that in which the cylinder is moving, and effect through the mediumship of the levers connecting with the cams the depression of the cam preceding the yarn-guide and the elevation of the cam following it.

The guide-plate G' extends beyond the outer edges of each of the recesses D D', the object thereof being to arrest the upward movement of the needles acquired by them in the inclined grooves H', and to direct them in their proper movements along the ledge.

In actuating the machine for knitting straight fabric, as in forming the heel and toe of stockings, only a portion of the needles are employed, the unemployed needles being retired by elevating them, so that their heels will rest upon the upper edge of the guide-plate G', upon which they are elevated by the inwardly-inclining bevels N'. The ends of the said guide-plate are recessed to receive spring-actuated cams O', which constitute resilient contact-points for the heels of the needles. Ordinarily the heels of the needles will be respectively elevated or depressed above and below the cams without impinging squarely against them. When, however, this occurs, the cams will recede and permit the needles to be turned into their proper channels.

Another feature of construction deserving attention is the arrangement of parts in such manner that all of the regular elevations and depressions of the needles will be effected by the fixed surfaces F' and G', and not by the cams or any movable parts, as is often the case in machines of this character. This feature is an important one, in that the momentum of the needles will invariably work movable parts loose; but in my machine this cannot occur.

Figure 5:
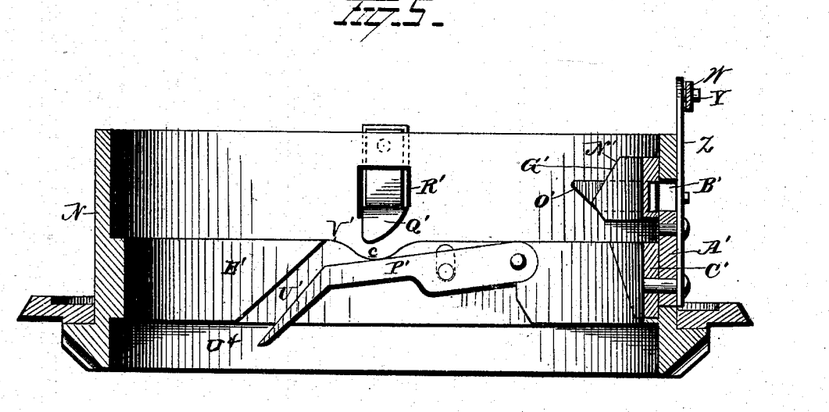
Fig. 5 is a similar view, showing the devices employed to retire a portion of the needles when it is desired to change the character of the stitch of the fabric being knitted.
Figures 6, 9, 12, 13:
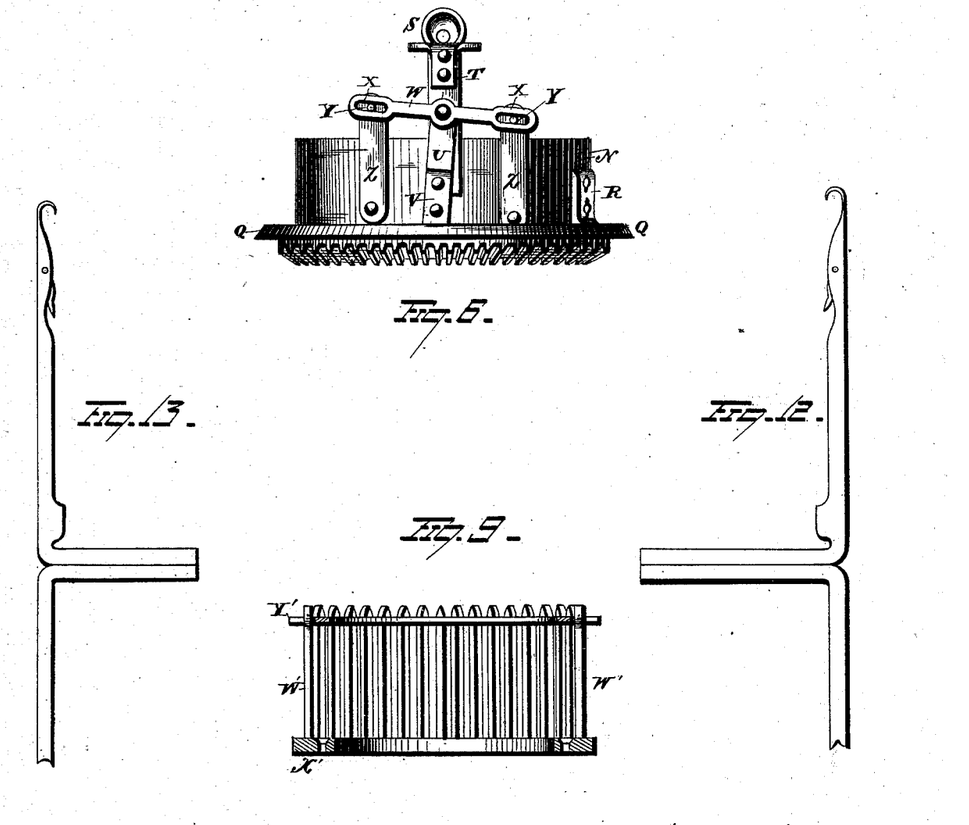
Fig. 6 is a view in front elevation of the cam-cylinder.
Fig. 9 is a view thereof in vertical cross-section.
Figs. 12 and 13 are views in side elevation of long and short heeled needles, respectively.

The retirement of a portion of the needles when the machine is being operated as a straight-knitting device has been alluded to; but provision must also be made for retiring a portion of the needles when the cylinder is being operated as a circular knitter, for the purpose of changing the character of the fabric produced, as for knitting ribbed work. In such case the heels of those needles which it is necessary to retire to effect the desired results are made shorter than the heels of the other needles, and hence have only partial bearing upon the ledge E'. These short-heeled needles are preferably arranged to alternate with every third long-armed needle. In retiring them they are depressed and carried below the ledge E'. This is effected by depressing the plate P' and throwing the angular deflecting-lug Q' out of the recess R', where it is normally stationed. The plate P' and the lug Q' are operated by suitable levers, S' and T', respectively, which are secured to the outer face of the cam-cylinder. The deflection of the plate P' opens a channel, U', to the space U⁴ below the ledge E', while lug Q', when thrown out of line with the interior wall of the cylinder, operates with twofold effect, for it not only depresses all of the needles into the depression c, formed in the edge of the ledge E', but also forces all of the short-heeled needles inward and directs them into the channel U. The outer ends of the heels of the long-heeled needles are guided by the ledge V' to the adjoining edge of the ledge E'. After the desired number of needles have been retired the plate P' is restored to its original position, as is also the lug Q'. When it is desired to bring the retired needles into play again, the lever P' is depressed and the motion of cam-cylinder is reversed. The needles will now rise through the channel U' to their normal positions of bearing upon the upper edge of the ledge E'. When all of the retired needles have been thus restored, the lever P' is elevated and the operation of the machine resumed.

Figure 8:
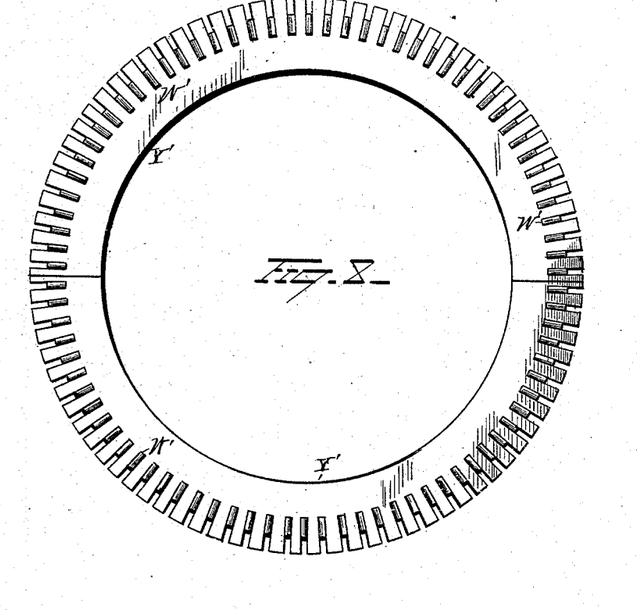
Fig. 8 is a plan view of the skeleton cylinder.

A skeleton cylinder interposed between the needle-cylinder and the cam-cylinder fulfills the function of holding the needles in place, and of guiding them as they are elevated and depressed by the action of the cam-cylinder. It consists of a ring, X', and the fingers W', the said ring being adapted to be removably secured to the bed-plate of the machine, screws being preferably employed. The object in making provision for the removal of this cylinder is to permit it to be taken from the machine and substituted by another having a greater or less number of fingers, according as it is desired to adapt the machine to knit coarse or fine fabric. When the skeleton cylinder is changed it will be of course necessary to change the needle-cylinder, which is effected by reversing the screws which secure the ring X' to the bed-plate B and substitute it by another conforming in character to the skeleton cylinder. In virtue of this removable attribute of the skeleton cylinder, by accompanying each machine with two or more cylinders of the same size, but having different numbers of fingers, and with suitable needle-cylinders conforming in character with the skeleton cylinders, machines constructed in accordance with my invention may be easily set up to do either coarse or fine work.

Heretofore the office of the skeleton cylinder, as shown in patent numbered 226,091, granted to me for an improvement in circular-knitting machines, and sealed March 30, 1880, has been fulfilled by a series of fingers inserted in holes drilled in the bed-plate, and inasmuch as such fingers are practically incapable of being increased or decreased in number the machines provided with them have been limited to one class of work.

Slotted semicircular plates Y' are employed to keep the fingers W' of the cylinders rigid, and to prevent them from being upset when from any cause the heels of the needles which extend between the said fingers are pressed against them with unusual force.

Figure 3:
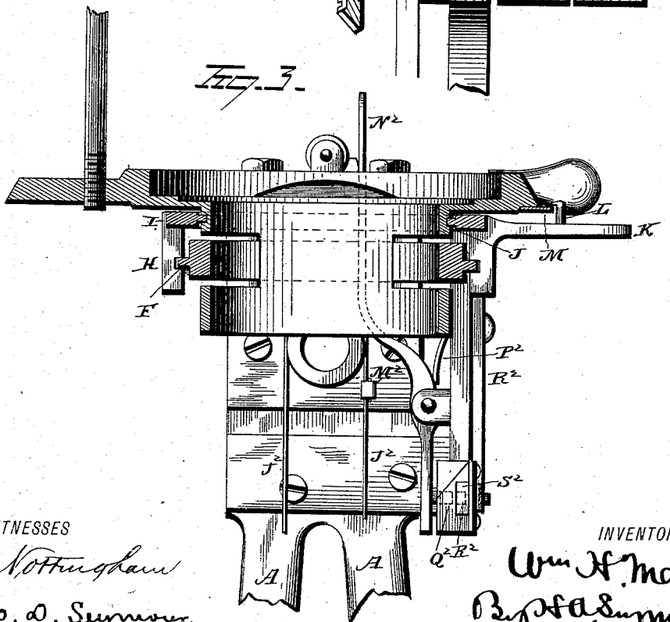
Fig. 3 is a similar view of the machine, showing the devices employed for automatically stopping it, the needle, skeleton, and cam cylinders being removed.
Figure 10:
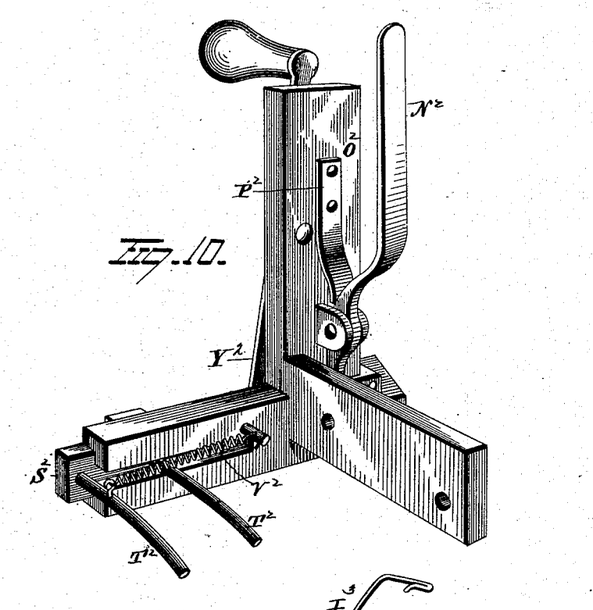
Fig. 10 is a rear view, in perspective, of the belt-shipping device which is automatically operated to stop the machine.

Having thus described those portions of the machine which relate to the formation of the stitch, we come now to the consideration of those devices designed to automatically stop the machine at predetermined stages of development in the article being knitted. This stopping mechanism is actuated by the weight $A^2$, which consists of two disks provided with perforated lugs $B^2$ and connected by an upright bar, $C^2$. A small rod, $D^2$, designed to retain in position any additional weights which may be interposed between the two disks aforesaid, is provided with a hook to engage with the setting-up device to which the article being knitted is attached. An upright rod, $F^2$, inserted in the perforations of the lugs $B^2$, guides the weight in all of its vertical movements, while the guide-bar $G^2$, engaging with the arm $H^2$ of the weight, prevents the same from undue lateral motion. A rest, $I^2$, arranged to be engaged with the arm $H^2$, is designed to support the weight when not in use. One end of the indicating-band $J^2$, which travels over a roller, $K^2$, mounted in suitable journals secured to the bed-plate B, is attached to the said arm $H^2$ of the weight, while its other end terminates in a light weight, $L^2$, the said band being provided with an indicating or graduated surface, and also with adjustable tripping-lugs $M^2$. As the weight $A^2$ descends the indicating-band travels over the roller $K^2$ and indicates to the operator the stage of development in the article being knitted. The operator is thus enabled to manipulate the lever K and change at the proper points the tension of the knitted fabric for the purpose of imparting to it the desired shape. The tripping-lugs $M^2$ are appropriately placed on the said band, so that at the proper time for stopping the machine they will engage with the inner face of the lever $N^2$, pivoted to the plate $O^2$, which latter is rigidly secured to the frame A. The spring $P^2$ sustains the pin $Q^2$, attached to the lower end of the lever $N^2$, in normal engagement with the hole $R^2$ in the bar $S^2$, which reciprocates in a recess formed in the lower arm of the plate $O^2$. The said bar $S^2$, which is provided with a shipping device, $T^2$, arranged to embrace the operating-belt, is held in its condition of engagement with the pin $Q^2$ against the retractile force of the spring $V^2$, exerting a constant force to retract the bar and transfer the belt from the fixed pulley $W^2$ to the loose pulley $X^2$. When by the action of one of the lugs $M^2$ upon the lever $N^2$ the pin $Q^2$, attached to it, is withdrawn from the hole $R^2$, the said spring will at once retract the bar $S^2$, and by shipping the belt stop the machine. The hand-lever $Y^2$ is designed and arranged to throw the belt back upon the rigid pulley $W^2$, for the purpose of starting the machine again.

It is apparent that if it is desired to stop the machine at any other than the predetermined points marked by lugs on the indicating-belt, this may be done by simply moving the projecting upper end of the trip-lever $N^2$ away from the roller $K^2$ with the hand or finger.

Figure 11:
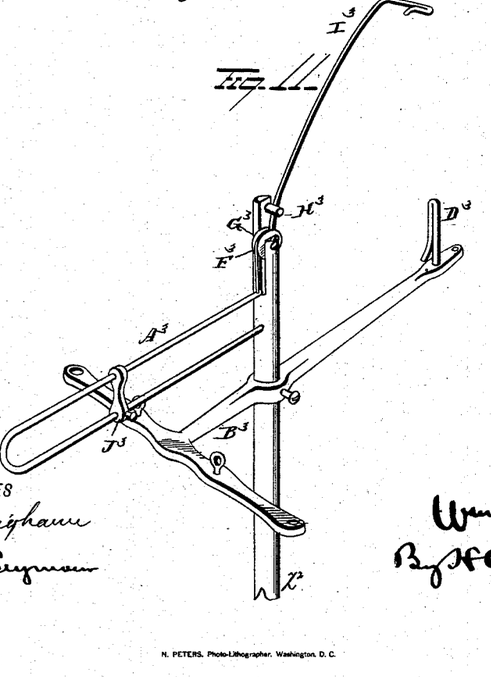
Fig. 11 is a view in perspective of my improved adjustable take-up.

Finally we come to the consideration of the adjustable take-up device, which consists of the vertical rod $Z^2$ and the spring $A^3$ and its attachments. The said rod $Z^2$ is secured to the bed-plate B of the machine. A vertically-adjustable T-bar, $B^3$, mounted upon it, is provided with guide-rings for the yarn, and also with the check $D^3$. The lower arm of the bent rod-spring $A^3$ is rigidly secured to the rod $Z^2$, near its upper end, while the upper arm of the said spring has a cord, $F^3$, attached to it, the said cord being secured to a disk, $G^3$, pivoted in a vertical slot, $H^3$, which bifurcates the upper end of the rod $Z^2$. A flexible wire, $I^3$, secured to the said disk, is provided at its outer end with a loop over which the yarn is passed. A tension-adjuster, $J^3$, is mounted on the spring $A^3$, both arms of which it embraces. As the said adjuster is moved toward or from the ends of the said spring the force which the same transmits to the wire $I^3$ is diminished or increased, respectively. When the needles are taking yarn the wire $I^3$ will be depressed; but as soon as the cam-cylinder is reversed the slack yarn will be drawn taut and engaged with the check $D^3$ by the ascent of the wire $I^3$.

The description of the machine has been so freely interspersed with description of its mode of operation that it is thought a further exposition of the same is unnecessary.

It is apparent that the demands and requirements resulting from the oscillation of the ordinary practical conditions will necessitate certain changes in the device herein shown. I would therefore have it understood that I do not limit myself to the exact construction herein shown and described, but hold myself at liberty to make such slight changes and alterations as may fairly fall within the spirit and scope of my invention.

Having fully described my invention, what I claim as new, and desire to secure by Letters Patent, is—

1. The combination, with the bed-plate, of an annular bearing-ring secured to said bed-plate, a cam-cylinder suspended in said ring, and plates secured to the outer face of the cylinder and having bearing upon said ring, substantially as set forth.

2. The combination, with the bed-plate, of an annular bearing-ring, a cam-cylinder suspended in said ring, and vertically-adjustable plates secured to the outer face of the cylinder and having bearing upon the ring to support the cylinder therein, substantially as set forth.

3. The combination, with a needle-cylinder and needles, of a cam-cylinder provided with two stitch-cams, means to actuate the cam-cylinder in the bed-plate of the machine, a bar pivoted to the cam-cylinder, and having cam-links respectively attached to the stitch cams pivoted to its ends, and a depending arm pivoted to the cam-cylinder, made rigid with the bar aforesaid, and in contact with a bearing carried by the bed-plate of the machine, and arranged to be retarded thereby in an opposite direction from the direction in which the cam-cylinder is moving, substantially as set forth.

4. The combination, with a needle-cylinder and needles, of a cam-cylinder provided with stitch-cams, means for actuating the said cam-cylinder, a bed-plate in which the same is suspended, a bar pivoted to the cam-cylinder and having slotted ends, cam-links uniting the ends of said bar and the cams, a depending plate pivoted to the cam-cylinder and made rigid with the bar aforesaid, and an annular bearing-plate carried by the bed-plate of the machine and forming a bearing for the said depending plate, substantially as set forth.

5. The combination, with a cam-cylinder having a ledge located within it, said ledge being provided with a needle-elevating plate, and with two recesses, respectively located on opposite sides of said plate, which extends above the ledge, of a guide-plate located above the ledge and extending beyond the recesses formed in it, stitch-cams located in said recesses, and means to actuate said cams to form passages above their upper and below their lower faces, substantially as set forth.

6. The combination, with a cam-cylinder having a ledge located in it, said ledge being provided with two recesses, and a needle-elevating plate, of a guide-plate located above the ledge and extending beyond the recesses therein, and movable lugs located in recesses formed in the end of the guide-plate, substantially as set forth.

7. The combination, with a cam-cylinder having a ledge located in it, said ledge being provided with two recesses, and a needle-elevating plate, of a guide-plate located above the ledge and extending beyond the recesses therein, the ends of the plate being recessed, and lugs and springs located in said recesses, substantially as set forth.

8. The combination, with a needle-cylinder and needles, of a bed-plate and a removable skeleton cylinder adapted to be attached to said bed-plate, substantially as set forth.

9. The combination, with a needle-cylinder and needles, of a bed-plate, and a removable skeleton cylinder consisting of a ring adapted to be secured to the bed-plate, and fingers mounted in said ring, substantially as set forth.

10. The combination, with a weight adapted to be depended from the article being knitted, and provided with a laterally-extending arm, of an upright rod with which the arm of the weight engages, and the standard of the machine, provided with a lug adapted to engage the arm of the weight and support the same, substantially as set forth.

11. The combination, with a knitting-machine, of a weight consisting of two disks, provided each with a perforated lug and united by an upright bar, and a rod extending centrally through the disks, the upper end of the rod being provided with a hook to adapt the weight to be depended from the article being knitted, and a stationary guide-rod passing through the perforated lugs of the disks, substantially as set forth.

12. The combination, with a knitting-machine, of a weight adapted to be depended from the article being knitted, a belt attached to the weight and arranged to be actuated by it, a weight secured to the free end of the belt, movable lugs secured to the belt, a roller for the belt, mounted in the standard of the machine, and belt-shipping mechanism located in close proximity to said roller and adapted to be actuated by it to stop the machine, substantially as set forth.

13. In a knitting-machine, the combination, with a bed-plate having a circular depending flange provided on each side with horizontal slots, of a needle-cylinder located in said bed-plate and flange, a clamp to embrace the flange and clasp the cylinder, and provided on each side with inclines, and a ring mounted in a groove surrounding the flange, and having depending slotted lugs to receive the inclines of the clamp, and provided with an operating-lever, substantially as set forth.

14. The combination, with a knitting-machine, of a weight adapted to be depended from the article being knitted, a belt attached to the weight and arranged to be actuated by it, movable lugs secured to the belt, a roller for the belt, mounted in the standard of the machine, a spring-pressed lever located in close proximity to said roller and provided with a pin, a slide-bar provided with arms to embrace the belt, and having a hole to receive the pin of the spring-pressed lever, and a spring to actuate said bar, substantially as set forth.

15. In a knitting-machine, the combination, with an upright rod, of a bent rod-spring having one arm rigidly secured to said rod, a disk mounted in the upper end of the rod, flexible connection between the disk and the free end of the spring, a wire arm secured to said disk, and a tension-adjuster embracing both arms of the bent rod-spring and adapted to be moved thereupon, substantially as set forth.

In testimony whereof I have signed this specification in the presence of two subscribing witnesses.

WILLIAM H. MAYO.

Witnesses:
HERMAN MORAN,
A. W. BRIGHT.